United States Patent
Dijken et al.

(10) Patent No.: US 9,874,317 B2
(45) Date of Patent: Jan. 23, 2018

(54) SOLID STATE LIGHTING DEVICE

(71) Applicant: PHILIPS LIGHTING HOLDING B.V., Eindhoven (NL)

(72) Inventors: Durandus Kornelius Dijken, Eindhoven (NL); Rifat Ata Mustafa Hikmet, Eindhoven (NL); Leendert Van Der Tempel, Eindhoven (NL); Ties Van Bommel, Horst (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 102 days.

(21) Appl. No.: 14/888,820

(22) PCT Filed: Apr. 25, 2014

(86) PCT No.: PCT/EP2014/058413
§ 371 (c)(1),
(2) Date: Nov. 3, 2015

(87) PCT Pub. No.: WO2014/177457
PCT Pub. Date: Nov. 6, 2014

(65) Prior Publication Data
US 2016/0076711 A1 Mar. 17, 2016

(30) Foreign Application Priority Data
May 3, 2013 (EP) ..................... 13166406

(51) Int. Cl.
*F21S 4/00* (2016.01)
*F21V 3/00* (2015.01)
(Continued)

(52) U.S. Cl.
CPC ................. *F21K 9/52* (2013.01); *F21K 9/61* (2016.08); *F21K 9/64* (2016.08); *F21V 13/08* (2013.01);
(Continued)

(58) Field of Classification Search
CPC ..... F21K 9/52; F21K 9/61; F21K 9/64; F21V 29/56; F21V 29/70; F21V 29/83;
(Continued)

(56) References Cited

U.S. PATENT DOCUMENTS

| 5,109,463 A | * | 4/1992 | Lee | ........................ G02B 6/4298 385/123 |
| 6,542,231 B1 | * | 4/2003 | Garrett | ................... G01N 21/05 250/227.11 |

(Continued)

FOREIGN PATENT DOCUMENTS

| GB | 2461689 A | 1/2010 |
| JP | 2003150084 A | 5/2003 |

(Continued)

*Primary Examiner* — Alexander Garlen
(74) *Attorney, Agent, or Firm* — Akarsh P. Belagodu

(57) ABSTRACT

An SSL lighting device (1) comprising a housing (2), which has a reflective inner surface (3), and an elongated light guide (6) which includes a wavelength converting material (10) for converting light in a first wavelength range to light in a second wavelength range. The elongated light guide (6) comprises two ends (7a, 7b), a portion for receiving light (18) and a portion for emitting light (19). The portion for receiving light (18) is arranged inside the housing (2) and the portion for emitting light (19) is arranged outside the housing (2) and at least one of the two ends (7a, 7b) forms the portion (19) for emitting light. The SSL lighting device (1) also comprises a plurality of SSL light sources (4) arranged inside the housing (2) at a distance from the elongated light guide (6). A part of the light emitted from the plurality of SSL light sources (4) into the housing (2) enters the light guide (6) via the portion for receiving light (18) and is absorbed and converted by the wavelength converting material (10). By enclosing the light sources (4) and a portion of the light guide (6) inside a housing (2) with a reflective inner surface (3) and by having a wavelength conversion process (Continued)

occurring inside the light guide (6), this construction enables light from several light sources (4) to be used for providing a single high-intensity and high-power light source.

14 Claims, 2 Drawing Sheets

(51) Int. Cl.

| | | |
|---|---|---|
| *F21V 5/00* | (2015.01) | |
| *F21V 21/30* | (2006.01) | |
| *F21K 99/00* | (2016.01) | |
| *F21V 8/00* | (2006.01) | |
| *F21V 29/00* | (2015.01) | |
| *F21V 29/56* | (2015.01) | |
| *F21V 29/83* | (2015.01) | |
| *F21V 29/70* | (2015.01) | |
| *F21V 13/08* | (2006.01) | |
| *F21K 9/61* | (2016.01) | |
| *F21K 9/64* | (2016.01) | |
| *F21Y 103/10* | (2016.01) | |
| *F21Y 115/10* | (2016.01) | |
| *F21Y 103/33* | (2016.01) | |

(52) U.S. Cl.
CPC .......... *F21V 29/2212* (2013.01); *F21V 29/56* (2015.01); *F21V 29/70* (2015.01); *F21V 29/83* (2015.01); *G02B 6/0003* (2013.01); *G02B 6/0006* (2013.01); *G02B 6/0008* (2013.01); *G02B 6/0096* (2013.01); *F21Y 2103/10* (2016.08); *F21Y 2103/33* (2016.08); *F21Y 2115/10* (2016.08)

(58) Field of Classification Search
CPC ... F21V 29/2212; F21V 13/08; G02B 6/0003; G02B 6/0006; G02B 6/0008; G02B 6/0096

See application file for complete search history.

(56) References Cited

U.S. PATENT DOCUMENTS

| 6,584,714 B1 | 7/2003 | Wehrmann et al. | |
|---|---|---|---|
| 2010/0187440 A1* | 7/2010 | Jaffe .......................... | G01J 1/58 |
| | | | 250/459.1 |
| 2013/0021822 A1 | 1/2013 | Wimmer | |

FOREIGN PATENT DOCUMENTS

| JP | 2010192125 A | 9/2010 |
|---|---|---|
| JP | 2011528904 A | 12/2011 |
| TW | 201137469 A | 11/2011 |
| WO | 2006035349 A1 | 4/2006 |
| WO | 2011156645 A1 | 12/2011 |
| WO | 2012146960 A1 | 11/2012 |

* cited by examiner

SOLID STATE LIGHTING DEVICE

CROSS-REFERENCE TO PRIOR APPLICATIONS

This application is the U.S. National Phase application under 35 U.S.C. §371 of International Application No. PCT/EP2014/058413, filed on Apr. 25, 2014, which claims the benefit of European Patent Application No. 13166406.2, filed on May 3, 2013. These applications are hereby incorporated by reference herein.

FIELD OF THE INVENTION

The present disclosure relates to the field of projection lighting applications, automotive lighting and general lighting applications, and more specifically to a solid-state lighting (SSL) device.

BACKGROUND OF THE INVENTION

Different types of projection lighting systems are known and used in various illumination applications. Typical applications include video projectors, display lighting, automotive lighting and scientific instrumentation.

Ultra high-pressure mercury lamps, metal-halide lamps, xenon lamps, halogen lamps and lasers are examples of conventional types of light sources that are used in projection lighting systems. In recent years, the development of SSL technology has led to attempts to construct projection systems which use different types of light-emitting diodes. Compared with conventional light sources, SSL light sources have a wider range of color gamut, higher color saturation and a smaller line width. SSL light sources also have a long life time and are mercury-free. An example of a lighting arrangement using SSL light sources is disclosed in US 2013/0021822 A1. The disclosure relates to an optical waveguide plate.

The required light source characteristics depend on the application. Video projectors, for example, require small blue, red and green high-intensity light sources which emit light with a small etendue. It is possible to improve existing SSL lighting devices in these respects.

SUMMARY OF THE INVENTION

An objective is to provide an improved or alternative SSL lighting device for projection lighting applications, automotive lighting and general lighting applications. An aspect of particular interest is the capacity of the light source to generate green light with high intensity and small etendue.

The invention is defined by the independent claims. Embodiments are set forth in the dependent claims, the description and the drawings.

According to a first aspect, there is provided an SSL lighting device comprising a housing, which has a reflective inner surface, and an elongated light guide which includes a wavelength converting material for converting light in a first wavelength range to light in a second wavelength range. The elongated light guide comprises two ends, a portion for receiving light and a portion for emitting light. The portion for receiving light is arranged inside the housing and the portion for emitting light is arranged outside the housing, and at least one of the two ends forms the portion for emitting light. The SSL lighting device also comprises a plurality of SSL light sources which are configured to emit light in the first wavelength range and which are arranged inside the housing at a distance from the elongated light guide.

An SSL light source may, for example, be a light source chosen from the group consisting of semiconductor light-emitting diodes, organic light-emitting diodes, polymer light-emitting diodes and laser diodes.

In use, a part of the light emitted from the plurality of SSL light sources into the housing enters the light guide via the portion for receiving light and is absorbed and converted by the wavelength converting material, and a part of the converted light is waveguided inside the light guide and emitted through the portion for emitting light.

By enclosing the light sources and a portion of the light guide inside a housing with a reflective inner surface and by having a wavelength conversion process occurring inside the light guide, this construction enables light from several light sources to be used for providing a single high-intensity and high-power light source.

The light intensity and the power output of a SSL lighting device according to the description above can be higher than the light intensity and the power output of a single SSL light source of the plurality of SSL light sources. The SSL light sources are arranged along the longitudinal direction or length of the elongated light guide. The light emitting surfaces of the SSL light sources may face the elongated light guide.

The emitting portion can be designed to emit light with an etendue sufficiently small for a projection system, for example by adjusting the size of the surface area of the emitting portion. The elongated light guide has two ends and the emitting portion may be formed by one of the at least two ends.

The SSL lighting device may be scalable, i.e. increasing the output power of the SSL light sources may increase the output power of the elongated light guide without increasing the etendue of the light emitted by the elongated light guide.

In a SSL lighting device according to the description above, the light guide is less affected by the heat generated by the SSL light sources since the light guide is arranged at a distance from the SSL light sources. Such an arrangement may result in a cooler light guide and, consequently, an increased efficiency, i.e. output power divided by input power, of the SSL lighting device.

The length of the portion of the elongated light guide that is arranged inside the housing may be increased by providing the elongated light guide with windings. For example, the elongated light guide can be coiled. Increasing the length of the portion of the elongated light guide that is arranged inside the housing may increase the output power of the SSL lighting device. Moreover, increasing the length of the portion of the elongated light guide that is arranged inside the housing will further increase the surface area from which heat can dissipate. This may improve the cooling of the elongated light guide.

The converted light may be waveguided via total internal reflection. Total internal reflection is an effective way of guiding light that helps reduce the attenuation that the light experiences when it travels through the light guide.

According to one embodiment, there is substantially no overlap between the first wavelength range, where the wavelength converting material shows absorption, and the second wavelength range, where the wavelength converting material shows emission. By "substantially no overlap" is meant that the overlap is less than 15% of the shortest wavelength range, alternatively less than 10%, less than 5% or 0%. The smaller the overlap between the first and second wavelength ranges, the smaller the probability of a converted photon being re-absorbed by the wavelength converting material. The efficiency, i.e. the output power to input power ratio, of the SSL lighting device may therefore increase with decreased overlap between the first and second wavelength ranges. Typically, the first wavelength range is a wavelength range for which cheap SSL light sources with high intensity are easy to produce and in at least part of which the wavelength converting material shows absorption. The first wavelength range can be from about 300 nm to about 550 nm. The second wavelength range can be from about 400 nm to about 800 nm.

The wavelength converting material can be a luminescent material. This class of materials includes several substances with appropriate absorption and emission spectra. The wavelength converting material may for example be selected from the group consisting of phosphor, nano-sized inorganic phosphor, a lanthanide complex, a luminescent organic molecule, a quantum rod and a quantum dot. The wavelength converting material may be yttrium aluminum garnet doped with a rare earth element and/or lutetium aluminum garnet doped with a rare earth element. The rare earth element may be cerium.

The wavelength converting material may comprise either Ce doped yttrium aluminum garnet (YAG, Y3AL5O12), lutetium aluminum garnet (LuAG), LuGaAG 5 or LUYAG. YAG, LUAG, LuGaAG and LuYAG have appropriate refractive indices.

The wavelength converting material may be selected from the group consisting of (MI 1-x-yMII xMIII y)3(MIV 1-zMV z)5O12- where MI is selected from the 10 group comprising Y, Lu or mixtures thereof, MII is selected from the group comprising Gd, La, Yb or mixtures thereof, MIII is selected from the group comprising Tb, Pr, Ce, Er, Nd, Eu or mixtures thereof, MIV is Al, MV is selected from the group comprising Ga, Sc or mixtures thereof, and $0 \leq x \leq 1$, $0 \leq y \leq 0.1$, $0 \leq z \leq 1$, (MI 1-x-yMII x,MIII y)2O3- where MI is selected from the group comprising Y, Lu or mixtures thereof, MII is selected from the group comprising Gd, La, Yb or mixtures thereof, MIII is selected from the group comprising Tb, Pr, Ce, Er, Nd, Eu, Bi, Sb or mixtures thereof, and $0 \leq x \leq 1$, $0 \leq y \leq 0.1$, (MI 1-x-yMII xMIII y)S1-zSez- where MI is selected from the group comprising Ca, Sr, Mg, Ba or mixtures thereof, MII is selected from the group comprising Ce, Eu, Mn, Tb, Sm, Pr, Sb, Sn or mixtures thereof, MIII is selected from the group comprising K, Na, Li, Rb, Zn or mixtures thereof, and $0 \leq x \leq 0.01$, $0 \leq y \leq 0.05$, $0 \leq z \leq 1$, (MI 1-x-yMII xMIII y)O— where MI is selected from the group comprising Ca, Sr, Mg, Ba or mixtures thereof, MII is selected from the group comprising Ce, Eu, Mn, Tb, Sm, Pr or mixtures thereof, MIII is selected from the group comprising K, Na, Li, Rb, Zn or mixtures thereof, and $0 \leq x \leq 0.1$, $0 \leq y \leq 0.1$, (MI 2-xMII xMIII 2)O7- where MI is selected from the group comprising La, Y, Gd, Lu, Ba, Sr or mixtures thereof, MII is selected from the group comprising Eu, Tb, Pr, Ce, Nd, Sm, Tm or mixtures thereof, MIII is selected from the group comprising Hf, Zr, Ti, Ta, Nb or mixtures thereof, and $0 \leq x \leq 1$, (MI 1-xMII xMIII 1-yMIV y)O3- where MI is selected from the group comprising Ba, Sr, Ca, La, Y, Gd, Lu or mixtures thereof, MII is selected from the group comprising Eu, Tb, Pr, Ce, Nd, Sm, Tm or mixtures thereof, MIII is selected from the group comprising Hf; Zr, Ti, Ta, Nb or mixtures thereof, 30 and MIV is selected from the group comprising Al, Ga, Sc, Si or mixtures thereof, and $0 \leq x \leq 0.1$, $0 \leq y \leq 0.1$, or mixtures thereof.

The wavelength converting material may comprise an organic phosphor. Examples of organic phosphor materials suitable for use as the wavelength converting material include luminescent materials based on perylene derivatives, which are for instance sold under the brand name Lumogen® by BASF. Examples of suitable commercially available products thus include, but are not limited to, Lumogen® Red F305, Lumogen® Orange F240, Lumogen® Yellow F170, and combinations thereof.

The luminescent material may be selected from the group consisting of quantum dots, quantum rods, quantum tetrapods and nano-crystals. Quantum dots or rods are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphode (InP), copper indium sulfide (CuInS2) and/or silver indium sulfide (AgInS2) can also be used. Quantum dots show very narrow emission bands and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

The elongated light guide may comprise a carrier material for the wavelength converting material, for example a polymer such as silicone, acrylic, glass, a copolymer or a transparent ceramic. A ceramic such as yttrium aluminum garnet and/or lutetium aluminum garnet may form the carrier material. By using a carrier material, it may be possible to use a wavelength material which has appropriate wavelength converting characteristics but which cannot, by itself, form a rigid light guide. If the elongated light guide comprises an outer wall made of, for example, one of quartz and glass, the carrier material can be a liquid.

The reflective inner surface of the housing may reflect at least 95% of incident light in the first wavelength range, alternatively at least 97% or at least 99%. The higher the portion of the incident light that is reflected, the higher the efficiency of the light engine and the less the housing is heated. This is desirable since heat may have an adverse effect on the efficiency of the SSL lighting device.

In order to cool the SSL lighting device during operation, the housing can be thermally connected to a heat sink. Other types of cooling techniques are also possible. For example, there may be provided means for creating a fluid flow inside the housing to cool the interior of the housing and the elongated light guide. The SSL lighting device can have means for creating a fluid flow inside the elongated light guide to cool the elongated light guide. Such a construction makes it possible to construct a compact and high-power SSL lighting device.

The SSL lighting device may have SSL light sources emitting light of different wavelengths, and it may have an elongated wave guide comprising more than one wavelength converting material. Such an SSL lighting device may have the capacity to emit light having different colors. For example, the SSL lighting device may have first and second types of SSL light sources, and the elongated light guide may comprise first and second types of wavelength converting materials. When the SSL light sources of the first type are turned on, the SSL lighting device emits light generated by the first type of wavelength converting material. Similarly, when the SSL light sources of the second type are turned on, the SSL lighting device emits light generated by the second type of wavelength converting material. When both types of SSL light sources are turned on, light generated by both wavelength converting materials is emitted.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
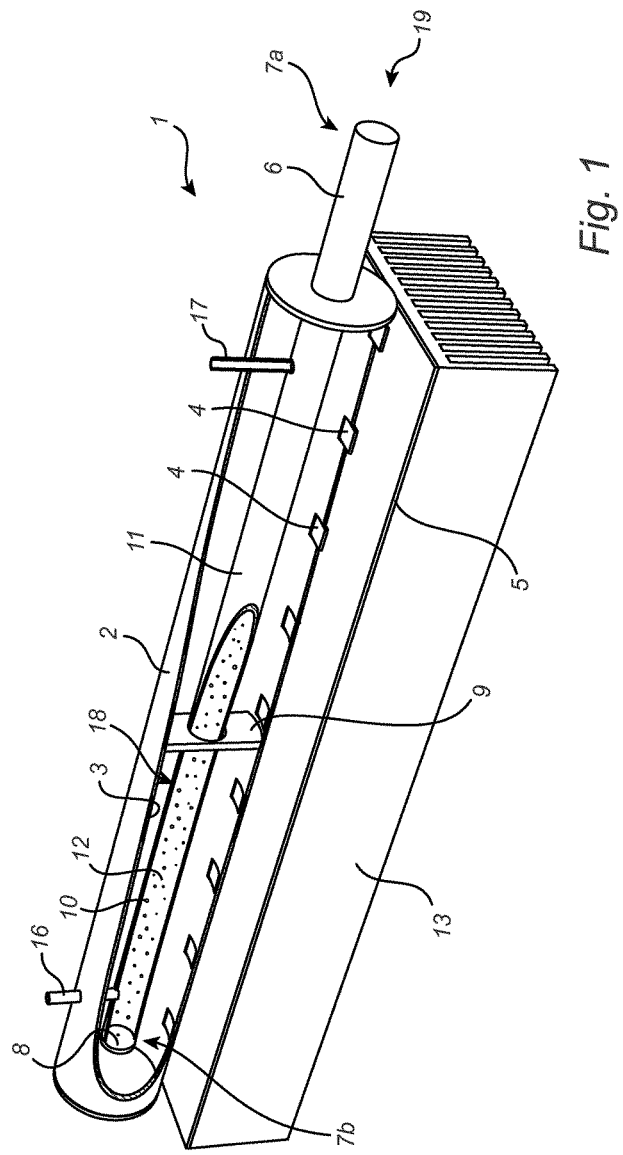
FIG. 1 is a schematic perspective view of the components of an SSL lighting device.

FIG. 1 illustrates an SSL lighting device 1 which has a housing 2 with a reflective inner surface 3. The shape of the housing 2 in FIG. 1 is that of a straight tube, but other shapes are possible. The housing 2 can be made of aluminum. The reflective inner surface 3 may consist of a titanium oxide in a silicone matrix, titanium oxide in porous alumina or a polytetrafluoroethylene material, such as OPDIMA produced by Gigahertz Optik.

The housing 2 functions as a mixing chamber for light in which light emitted by the SSL light sources 4, which are arranged to emit light into the housing 2, is reflected by the reflective inner surface. The SSL light sources 4 may be soldered on one or several printed circuit boards 5, and they may be domed or bare. The SSL light sources 4 may be arranged from about 1 mm to about 2 cm apart on the printed circuit board. The appropriate number of SSL light sources 4 depends on factors such as the power of each SSL light source 4 and the efficiency of the cooling of the SSL lighting device 1.

The housing 2 partly encloses an elongated light guide 6 (a "fiber"). The length of the elongated light guide 6 is typically in the range from about 5 cm to about 5 m, but may be up to 20 m. The elongated light guide 6 may have an aspect ratio, i.e. its length divided by its diameter, of at least 10, alternatively at least 100 or at least 500. The portion of the elongated light guide 6 enclosed by the housing 2 may be straight, folded or have multiple windings which, for example, form a coil. The inner diameter of the reflective housing can be, for example, from about two to about five times the length of the outer diameter of the elongated light guide. The SSL light sources 4 are arranged along the length or longitudinal direction of the elongated light guide 6.

Optionally, in order to prevent contact between the inner wall of the housing 2 and the portion of elongated light guide 6 which is enclosed by the housing 2, centering means 9 for supporting the elongated light guide 6 inside the housing 2 may be provided. The centering means 9 can have a hole through which the elongated light guide 6 passes. The centering means 9 can have the shape of, for example, a ring, a toroid, a torus or a sphere, and a hole in the centering means 9 can have sharp edges. The centering means 9 may be highly transparent or highly reflective, i.e. the centering means 9 may absorb no or very little light. The centering means 9 may include quartz or a metal. The centering means 9 may include titanium oxide and silicone on metal.

In order to prevent light from leaving the elongated light guide 6, the elongated light guide 6 can be coated with a cladding material having a low refractive index.

Arranged somewhere on the portion of the light guide 6 enclosed by the housing 2 is a portion for receiving light 18. The portion for receiving light 18 may be formed by the entire portion of the light guide 6 enclosed by the housing 2 along the length or longitudinal direction of the light guide 6 such that a relatively large part of the light emitted by the SSL light sources 4, that are arranged along the length of the light guide 6, enters the portion for receiving light 18 of the light guide 6. A portion for emitting light 19 is arranged somewhere on the portion of the light guide 6 that extends outside the housing 2.

The elongated light guide 6 may form a continuous loop. In FIG. 1, however, the light guide 6 has two ends 7a, 7b, at least one of which is arranged outside the housing 2 and forms the portion for emitting light 19. The end arranged inside the housing may be covered or sealed with a reflective mirror 8. The reflective mirror 8 can be made of a metal. Active soldering may be used to fasten the reflective mirror 8 to the elongated light guide 6. Note that both ends 7a, 7b may be arranged outside the housing 2.

The elongated light guide 6 has a wavelength converting material 10 for converting photons in a first wavelength range to photons in a second wavelength range. The second wavelength range can represent longer wavelengths than the first wavelength range. For example, the first wavelength range can be from about 300 nm to about 550 nm, alternatively from about 400 nm to about 495 nm, and the second wavelength range can be from about 495 nm to about 800 nm, alternatively from about 495 nm to about 570 nm or from about 620 nm to 740 nm. This means that the first wavelength range may include visible blue light and that the second wavelength range may include visible green light or visible red light. Preferably, the absorption spectrum and the emission spectrum of the wavelength converting material 10 have little or no overlap in order to improve the efficiency of the SSL lighting device 1.

The elongated light guide 6 may comprise a thin-walled tube 11 which can be cladded with an optical coating. The refractive index of the thin-walled tube 11 may be in the range from about 1.3 to about 2.5. The thin-walled tube 11 can be made of quartz, low light-absorbing glass or an extruded polymer. The shape of the ends 7a, 7b of the thin-walled tube 11 may be flat or spherical.

The elongated light guide 6 may comprise a carrier material 12 for the wavelength converting material 10. The carrier material 12 has a higher refractive index than the surrounding medium inside the housing 2. The refractive index of the carrier material 12 may be in the range from about 1.3 to about 2.5. The carrier material 12 can be a polymer, for example silicone or an acrylic material such as PMMA. The carrier material 12 may be glass or a transparent ceramic. The carrier material 12 can be a liquid, for example dimethylformamide, contained in the thin-walled tube 11. An example of a carrier material 12 and wavelength converting material 10 is a phosphor dissolved in dimethylformamide. Another example is fiber of PMMA doped with a phosphor.

In order to cool the SSL light sources 4 and/or the housing 2 during operation of the SSL lighting device 1, the printed circuit board 5 can be thermally connected to a heat sink 13. Cooling of the elongated light guide 6 can be achieved by providing the wall of the thin-walled tube 11 with one or several inlets 16 and one or several outlets 17 for circulating a fluid into and out of the thin-walled tube 11. The fluid may be the wavelength converting material 10.

During operation, the SSL light sources 4 emit light in a first wavelength range into the housing 2. Some of the emitted photons hit the elongated light guide 6 directly, others reflect off the reflective inner surface 3 of the housing one or several times before hitting the elongated light guide 6. Some photons are absorbed by the reflective inner surface 3 or the SSL light sources 4. Some of the photons which hit the elongated light guide 6 are reflected from the surface of the elongated light guide 6, others enter the elongated light guide 6.

A photon in the first wavelength range which has entered the elongated light guide 6 may leave the elongated light guide 6 and re-enter the housing 2. However, some photons in the first wavelength range which have entered the elongated light guide 6 will be absorbed by the wavelength converting material 10 which subsequently emits converted photons, i.e. photons in the second wavelength range.

A converted photon is emitted in a random direction. Some converted photons will leave the elongated light guide 6. However, since the refractive index of the carrier material 12 is higher than the refractive index of the surrounding medium inside the housing 2, most converted photons will be waveguided inside the elongated light guide 6 by total internal reflection towards one of the ends 7a, 7b of the elongated light guide 6. Whether or not a converted photon is waveguided depends on the so called total internal reflection angle $\theta$ defined by a $\sin(\theta)=n_s/n_c$, where $n_s$ is the refractive index of the surrounding medium and $n_c$ is the refractive index of the carrier material. The larger the difference between these refractive indices is, the larger the fraction of converted photons that are waveguided. Note that photons in the first wavelength range are never waveguided inside the elongated light guide 6; once inside elongated light guide 6, these photons either leave the elongated light guide 6 or are absorbed by the wavelength converting material 10. Note also that a small contact area between the centering means and the elongated light guide may reduce the risk of losses due to, for example, scattering or absorption.

A converted photon that leaves the elongated light guide 6 may subsequently re-enter but will then not be waveguided. A converted photon which is waveguided travels inside the elongated light guide 6 in one of the two longitudinal directions of the elongated light guide 6 until it reaches one of the two ends 7a, 7b. A converted photon which reaches an end 7a, 7b on which a reflective mirror 8 is mounted, reflects off the reflective mirror 8 and continues back into the elongated light guide 6. A converted photon which reaches an end 7a, 7b on which no reflective mirror 8 is mounted may reflect against the boundary between the end and the surrounding medium and continue back into the elongated light guide 6. However, most of these converted photons leave the elongated light guide 6 through the end and may be used for illumination purposes. Two factors which affect the extraction of light through an open end 7a, 7b are the geometrical shape of the end and the difference in refractive index between the end and the surrounding medium. In short, light enters the light guide 6 along its longitudinal direction and exits at one of the ends 7a, 7b of the light guide 6. The light intensity and power output of the lighting device is higher than using a single SSL light source 4, because the plurality SSL light sources 4 emits light that at least partly enters the light guide 6 at the portion for receiving light 18 along the longitudinal direction or length of the light guide 6, which light at least partly exits, at least partly converted, at at least one of the ends 7a, 7b which end has a smaller area than the area of the portion for receiving light 18. In other words, the lighting device according to the invention functions as a light concentrator providing a single high-intensity and high-power light source.

The SSL lighting device 1 in FIG. 1 has a single elongated light guide 6. However, the SSL lighting device 1 may comprise more than one elongated light guide each of which has its respective ends and which may generate light of different colors. For example, the SSL lighting device 1 may have a first and a second elongated light guide. In such an arrangement, the wavelength converting material of the second elongated light guide may be capable of absorbing the wavelength range which leaks outside the first elongated light guide. This light can then be absorbed by the wavelength converting material of the second elongated light guide and be converted to another wavelength. For example, the first elongated light guide can be used to generate green light whereas the second elongated light guide produces red light.

While the SSL lighting device operates, heat is inevitably generated. The heat is mainly due to the wavelength conversion process, other sources of heat are the SSL light sources 4, quantum yield loss and light absorption by the wavelength converting material 10 and the housing 2. Various techniques may be used to cool the different components of the SSL lighting device 1. For example, cooling may be achieved by thermally connecting a heat sink 13 to the SSL light sources 4 and/or the housing 2. Heat from the SSLs 4 may thereby be dissipated into the environment. Liquid cooling of the elongated light guide 6 may be possible if it comprises a thin-walled tube 11 filled with a liquid. The liquid is pumped into and out of the thin-walled tube 11 via an inlet 16 and an outlet 17 arranged in the thin-walled tube 11. The liquid is cooled outside the thin-walled tube 11. Scattering losses may be reduced by making the inlet 16 and the outlet 17 small relative to the cross-section of the thin-walled tube 11.

Figure 2:
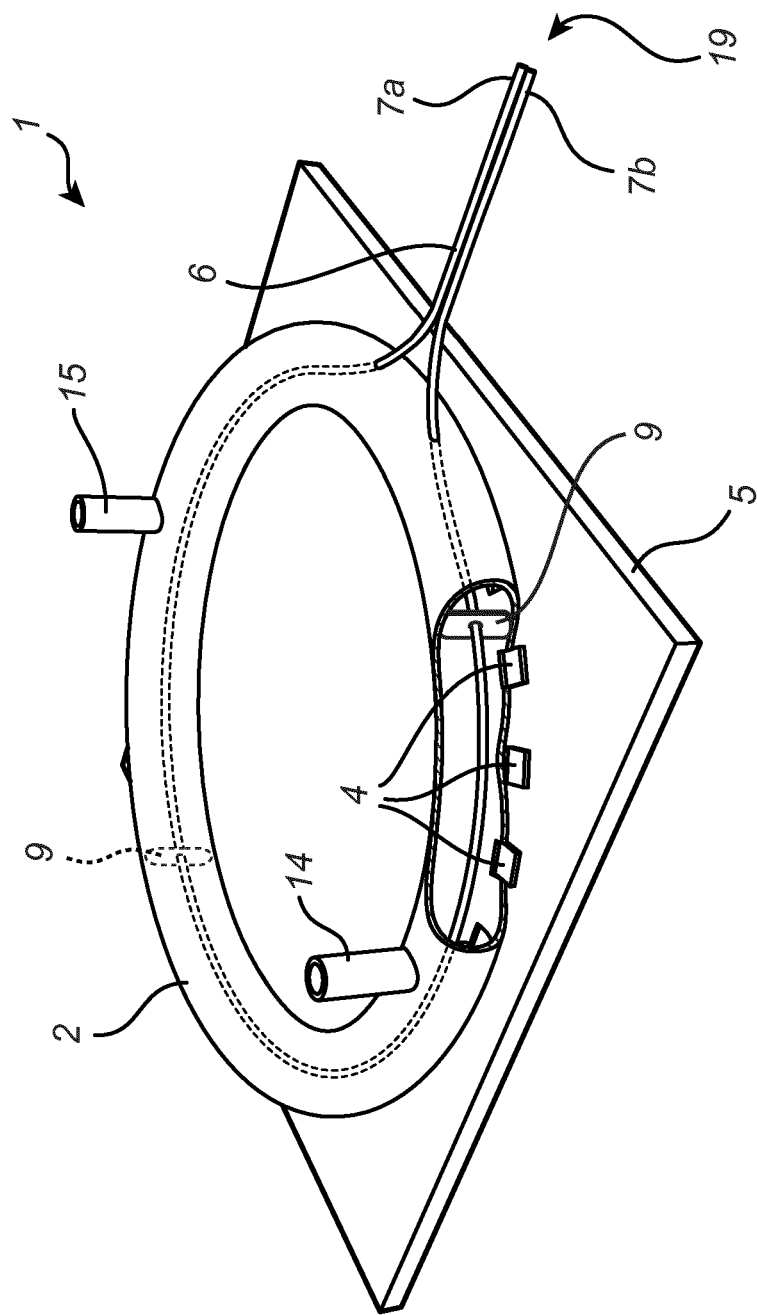
FIG. 2 is a schematic perspective view of an SSL lighting device with a torus-shaped housing and a light guide having two end portions outside the housing.

FIG. 2 illustrates an SSL lighting device 1, the housing 2 of which has the shape of a torus. The housing 2 can have another shape, for example the shape of a cube, a rectangular prism or a round container. In this embodiment both ends 7a, 7b of the elongated light guide are arranged outside the housing 2, and they are joined to form a joint portion 19 for emitting light. The housing 2 has one or several inlets 14 and one or several outlets 15 for a cooling fluid in order to cool the housing 2 interior, the SSL light sources 4 and the portion of the light guide 6 which is arranged inside the housing 2. The inlets 14 and outlets 15 are arranged in the housing 2 wall. The fluid may be a gas, a mixture of gases, a liquid or a mixture of liquids. The fluid may be air.

The SSL lighting device 2 in FIG. 2 operates in basically the same way as the SSL lighting device in FIG. 1. A difference is that the housing 2 and its interior are cooled by convection. A fluid (typically air) is pumped into and out of the housing 2, via the inlet 14 and the outlet 15, and cooled outside the housing. Note that it is possible to provide an SSL lighting device which is cooled by convection as well as cooled by thermal conduction.

The person skilled in the art realizes that the present invention by no means is limited to the preferred embodiments described above. On the contrary, many modifications and variations are possible within the scope of the appended claims. For example, the housing may be rectangular, there may be more than one elongated light guide, the portions for emitting light may be arranged so that they emit light in different directions and the SSL lighting device may provided with means for both convection cooling and liquid cooling.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An SSL lighting device comprising:
    a housing which has a reflective inner surface;
    an elongated light guide which includes a wavelength converting material for converting light in a first wavelength range to light in a second wavelength range, the elongated light guide extending between two ends and further comprising a portion for receiving light and a portion for emitting light, wherein the portion for receiving light is arranged inside the housing and the portion for emitting light is arranged outside the housing and wherein at least one of the two ends forms the portion for emitting light, wherein the elongated light guide includes an inlet configured to receive a flow of a liquid carrier material, the liquid carrier material containing at least a portion of the wavelength converting material; and
    a plurality of SSL light sources which are configured to emit light in the first wavelength range and which are arranged inside the housing at a distance from and along the longitudian direction of the elongated light guide,
    wherein a part of the light emitted from the plurality of SSL light sources into the housing enters the light guide via the portion for receiving light and is absorbed and converted by the wavelength converting material,
    wherein a part of the converted light is waveguided inside the light guide and emitted through the portion for emitting light.

2. The SSL lighting device according to claim 1, wherein the length of the portion of the elongated light guide that is arranged inside the housing is provided with at least one of windings and foldings.

3. The SSL lighting device according to claim 1, wherein the converted light is waveguided via total internal reflection.

4. The SSL lighting device according to claim 1, wherein there is substantially no overlap between the first wavelength range and the second wavelength range.

5. The SSL lighting device according to claim 1, wherein the wavelength converting material is a luminescent material.

6. The SSL lighting device according to claim 1, wherein the elongated light guide comprises a tube.

7. The SSL lighting device according to claim 1, wherein the housing has the shape of a torus and the portion for receiving light encircles the central axis of the torus.

8. The SSL lighting device according to claim 1, wherein the housing is thermally connected to a heat sink.

9. The SSL lighting device according to claim 1, wherein the SSL lighting device comprises a fluid flowing inside the housing to cool the interior of the housing and the elongated light guide.

10. The SSL lighting device according to claim 1, wherein the light intensity and the power output at the portion for emitting light are higher than the light intensity and the power output of a single SSL light source of the plurality of SSL light sources.

11. The SSL lighting device according to claim 1, wherein the SSL lighting device comprises a plurality of elongated light guides.

12. The SSL lighting device according to claim 11, wherein there is substantially no overlap between the second wavelength ranges of the elongated light guides of the plurality of elongated light guides.

13. The SSL lighting device according to claim 1, wherein the elongated light guide includes an outlet for receiving the flow of the liquid carrier material, the outlet being configured to carry the liquid carrier material away from the elongated light guide.

14. The SSL lighting device according to claim 1, further comprising: a pump configured to induce the flow of the liquid carrier material into the inlet and through at least a portion of the elongated light guide.

* * * * *